UNITED STATES PATENT OFFICE.

SAMUEL BALSDON, OF BROOKLYN, NEW YORK.

IMPROVED COMPOSITION FOR LUBRICATING MACHINERY.

Specification forming part of Letters Patent No. 40,229, dated October 13, 1863.

*To all whom it may concern:*

Be it known that I, SAMUEL BALSDON, of the city of Brooklyn, in the county of Kings and State of New York, have invented a new and Improved Composition of Anti-Friction Paste for Axles and Machinery; and I do hereby declare that the following is a full and exact description thereof, reference being had to the accompanying description of ingredients, designated as Nos. 2, 3, 4.

The composition is to be known as "Balsdon's Anti-Friction Paste for Axles and Machinery."

No. 2 is clarified lard prepared in the following manner: I take common lard and melt it with boiling water, and after the lard and boiling water have boiled together for the purpose of clarifying them and cleaning the lard of any impurities I let them cool, and then pour off the water. No. 3 is beeswax clarified by melting in boiling water, and not being boiled in the water, as with No. 2, and then, when cool, I pour off the water. No. 4 is prepared black-lead with vitriol, as follows: The black-lead is ground fine, and then to three pounds of black-lead ground put one gill of vitriol, and mix well together. After all the articles, Nos. 2, 3, and 4, are thus prepared, I take of No. 2 twelve pounds, of No. 3 one and one-half pound, and of No. 4 three pounds. I then melt them together, stirring them, till all the ingredients are mixed together, with a slow heat, and then I let them cool gradually.

What I claim as my invention, and desire to secure by Letters Patent, is—

The application of the different ingredients aforesaid, and prepared as aforementioned, and in the proportions aforementioned, for the purpose of making a composition paste that is anti-friction for axles and machinery, all substantially as set forth.

SAMUEL BALSDON.

Witnesses:
JAMES D. STEVENSON,
NATHANIEL ANDRUS.